United States Patent Office 3,410,671
Patented Nov. 12, 1968

3,410,671
FUEL CONTAINING A BASIC METAL COMPOSITION DERIVED FROM A NITRATED HYDROCARBON
William M. Le Suer, Cleveland, Ohio, assignor to The Lubrizol Corporation, Wickliffe, Ohio, a corporation of Ohio
No Drawing. Filed June 8, 1965, Ser. No. 462,444
19 Claims. (Cl. 44—51)

ABSTRACT OF THE DISCLOSURE

A fuel having improved combustion characteristics in which there is present a metal complex of a nitrated hydrocarbon.

---

This invention relates to the operation of internal combustion engines. In a more particular sense it relates to improved fuels for use in internal combustion engines such as are used in ships, automobiles, trucks, tractors and other automotive equipment.

A common problem in the operation of internal combustion engines is presented by the incomplete combustion of the fuel. Incomplete fuel combustion causes excessive wear of the engine parts and reduces engine efficiency. It results in the formation of black exhaust smoke, especially on rapid acceleration of the engine. The black smoke formed from a diesel truck creates a problem of air pollution and in many localities it constitutes a violation of the local law to so pollute the air.

Accordingly, it is a principal object of this invention to provide a method of operating engines wherein the fuel is more completely burned in the engine.

It is also an object of this invention to provide a method of operating engines whereby the formation of black exhaust smoke is minimized.

It is also an object of this invention to provide improved fuel compositions.

It is also an object of this invention to provide additives useful in fuels to improve their combustion characteristics.

It is also an object of this invention to provide gasoline compositions.

These and other objects are attained in accordance with this invention by providing a hydrocarbon fuel containing from about 0.01% to about 5% by weight of an oil-soluble, basic metal composition prepared by the process which comprises treating a mixture comprising a nitrated aliphatic hydrocarbon having a molecular weight of at least about 250, at least about 1 equivalent of a metal base wherein the metal is selected from the class consisting of alkali and alkaline earth metals, and at least about 0.1 equivalent of a promoter selected from the class consisting of phenols, alcohols, and aci-nitro alkanes having up to about 10 carbon atoms; with an acidic gas selected from the class consisting of carbon dioxide, hydrogen halides, and sulfur oxides.

The basic metal compositions useful as the additives in the hydrocarbon fuels of this invention are characterized by a metal ratio of at least one. The term "metal ratio" designates the ratio of equivalents of the metal to the equivalents of the nitrated hydrocarbon in the composition. For instance, a composition having two equivalents of barium per equivalent of the nitrated hydrocarbon has a metal ratio of two.

The basic metal compositions, as indicated previously, are obtained from a nitrated aliphatic hydrocarbon, an alkali or alkaine metal base, a promoter such as an alcohol, phenol, or aci-nitro alkane, and an acidic gas. The metal of the metal base is exemplified by sodium, lithium, potassium, magnesium, strontium, calcium, or barium. Alkaline earth metal oxides and hydroxides such as calcium and barium oxides and hydroxides are especially preferred because the products derived from them are found to be especially effective for the purposes of this invention. Other useful basic compounds of such metals are exemplified by metal alcoholates (e.g. methoxide, ethoxide, etc.), metal bicarbonates, and metal hydrides.

The acidic gas is preferably carbon dioxide. Other acidic gases such as hydrogen chloride, hydrogen bromide, sulfur dioxide and sulfur trioxide likewise are useful.

The alcohols useful as the promoter in the process preferably contain up to about 30 carbon atoms and may be monohydric alcohols, dihydric alcohols, or other polyhydric alcohols. They include, for example, methanol, ethanol, isopropanol, cyclohexanol, 3-butyl-cyclepentanol, dodecanol, behenyl alcohol, hexatriacontanyl alcohol, stearyl alcohol, oleyl alcohol, phenylethyl alcohol, 8-naphthyl-octadecanol, 3-(butylphenyl)decanol, ethylene glycol, diethylene glycol, triethylene glycol, tetrapropylene glycol, glycerol, methyl Cellosolve, butyl Cellosolve, carbitol, heptylphenoxy-(oxyethylene)$_{35}$-ethanol 3-chlorohexanol, bromophenyl ethanol, pentaerythritol, sorbitol, glucose, mannitol, sorbitol monomethyl ether, 3,5-dimethyl-2,4-hexanediol, 1,3-pentanediol, 1,2-octanediol and glycerol mono-oleate. Alcohols having from 1 to 6 hydroxy radicals and having up to about 12 carbon atoms in the hydrocarbon group are especially useful.

The term "hydrocarbon" or "hydrocarbon group," as used in the specification and claims herein, designates a substance or group which is essentially hydrocarbon in character. It may contain polar or non-hydrocarbon substituents provided that such substituents are not present in proportions so as to alter significantly the hydrocarbon character of the substance or group. The non-hydrocarbon substituents are exemplified by chloro, bromo, ether, keto, aldehydo, or iodo radicals. The upper limit of the proportion of such substituents in a hydrocarbon or a hydrocarbon group in most substances is about 10% by weight of the hydrocarbon portion of the substance or group.

The phenols useful as the promoter above may be phenol, naphthol, alkylated phenol or alkylated naphthol. It may contain one or more alkyl substituents on the aromatic nucleus. Specific examples include hexylphenol, heptylphenol, dodecylphenol, dihexylphenol, diisopropylphenol, tributylphenol, didodecylphenol, octadecylphenol, dioctyphenol, polypropene(molecular weight of 150)-substituted phenol, polyisobutene(molecular weight of 350)-substituted phenol, cyclohexylphenol, dodecyl cyclohexylphenol, behenylphenol, alpha-dodecyl-beta-naphthol, polybutene(molecular weight of 700)-substituted naphthol, and the like. In some instances, a polar group such as halo, nitro, or alkoxy group may be present in the alkyl substituent or the aromatic nucleus of the alkylated phenols. Bis-phenols and other polyhydroxy aromatic compounds such as alkylated bis-naphthols are contemplated for use in preparing the additives of this invention. Alkylated phenols preferred for use herein are the mono- and di-alkylphenols in which the alkyl substituent contains up to about 200 carbon atoms.

The aci-nitro alkanes useful as the promoter are principally those containing up to about 10 carbon atoms and containing at least one hydrogen radical on the carbon atom adjacent to the carbon atom having the nitro group. They include, for example, nitro-methane, nitro-ethane, nitro-propane, nitro-decane, nitro-cyclohexane, nitro-octane, 1,3-di-nitro-nonane, etc.

The nitrated aliphatic hydrocarbons for the most part are derived from petroleum fractions or olefin polymers. Pure aliphatic hydrocarbons such as synthetic alkanes or alkenes likewise are useful. Hydrocarbons which are less than about 10% aromatic are preferred, the aromaticity being based on the ratio of the carbon atoms within an aromatic nucleus such as benzenoid or naphthalenoid ring to the aliphatic carbon atoms present in the molecular structure of the hydrocarbon. Petroleum fractions, especially liquid fractions, are preferred. They include fractions having boiling points of up to about 600° F. Other fractions such as waxy or semi-solid fractions likewise are readily converted to nitrated hydrocarbons useful in preparing the basic compositions of this invention.

Olefin polymers useful for preparing the nitrated hydrocarbons include principally liquid polymers of monoolefins having from 2 to 30 carbon atoms. Polymers of lower 1-mono-olefins, i.e., having up to about 8 carbon atoms, such as ethylene, propene, 1-butene, isobutene, 1-hexene, 1-octene, and 2-methyl-1-heptene and polymers of medial olefins, i.e., olefins in which the olefinic linkage is not at the terminal position, likewise are useful. The latter are illustrated by polymers of 2-butene, 3-pentene, and 4-octene.

Also useful are the interpolymers of the mono-olefins such as those illustrated above with other interpolymerizable olefinic substances such as aromatic olefins, cyclic olefins, and polyenes. Such interpolymers may be prepared by polymerizing isobutene with styrene; isobutene with butadiene; propene with isoprene; ethylene with piperylene; isobutene with chloroprene; isobutene with p-methyl styrene; 1-hexene with 1,3-hexadiene 1-octene with 1-hexene; 1-heptene with 1-pentene; 3-methyl-1-butene with 1-octene; 3,3-dimethyl-1-pentene with 1-hexene; isobutene with styrene and piperylene; etc.

The relative proportions of the mono-olefins to the other polymerizable monomers in the interpolymers influence the stability and oil-solubility of the final products derived from such interpolymers. For reasons of oil-solubility and stability, the interpolymers contemplated for use in this invention should be substantially aliphatic and substantially saturated, i.e., they should contain at least about 80%, preferably at least about 95%, on a weight basis of units derived from the aliphatic mono-olefins and no more than about 5% of olefinic linkages based on the total number of carbon-to-carbon covalent linkages. In most instances, the percentage of olefinic linkages should be less than about 5% of the total number of carbon-to-carbon covalent linkages.

Specific examples of such interpolymers include the copolymer of 95% (by weight) of isobutene with 5% of styrene; the terpolymer of 98% of isobutene with 1% of piperylene and 1% of chloroprene; the terpolymer of 95% of isobutene with 2% of 1-butene and 3% of 1-hexene; the terpolymer of 80% of isobutene with 10% of 1-pentene and 10% of 1-octene; the copolymer of 80% of 1-hexene and 20% of 1-heptene; terpolymer of 90% of isobutene with 2% of cyclohexene and 8% of propene; and the copolymer of 80% of ethylene and 20% of propene.

Olefin polymers having molecular weights from about 250 to 10,000 are especially useful. Higher molecular weight olefin polymers likewise are useful and they may have molecular weights up to about 100,000 or even higher. The products derived from polymers having molecular weights above about 10,000 have been found to have viscosity index improving properties and are often preferred.

The nitrated hydrocarbons can be obtained simply by contacting a suitable hydrocarbon with nitric acid, such as 70% aqueous nitric acid, at temperatures of from about 50° C. to about 200° C., preferably from about 70° C. to 150° C. Other nitrating agents may be used in place of nitric acid. They include, for instance, nitric oxide or a combination of nitric acid or nitric oxide with a carrier such as sulfuric acid, glacial acetic acid, phosphoric acid or phosphorus pentoxide. The precise chemical constitution of the nitrated hydrocarbon is not known. It is known, however, that the nitrated product is a complex mixture of products containing nitro, nitrate, nitrite, nitroso, or other groups resulting from the oxidation of the hydrocarbon reactant. The relative proportions of such groups in the product are not known, so that the product is best described as a nitrated aliphatic hydrocarbon.

The amount of the nitrating agent to be used in relation to the hydrocarbon reactant is usually such that it will result in a product having an average of at least one nitrated group, e.g., a nitro group, within its molecular structure. In most instances, where the hydrocarbon reactant has a relatively high molecular weight, it may be desirable that there be at least one nitrated group for every 50 carbon atoms. To obtain such a product, the hydrocarbon reactant may be treated with suitable amounts of the nitrating agent until the desired degree of nitration in the product is accomplished, as indicated by its nitrogen content.

The nitration of the hydrocarbon may be carried out in the presence of an inert diluent or solvent which functions to facilitate the control of the reaction temperature and the mixing of the reactants. The inert diluent or solvent may be nitrobenzene, ethylene dichloride or a similar solvent which is not susceptible to reaction with the nitrating reagent.

The basic metal compositions useful as fuels of this invention, as indicated previously, are most conveniently obtained by preparing a mixture of a nitrated hydrocarbon, a metal base, and a promoter and treating the mixture with an acidic gas such as carbon dioxide, hydrogen chloride, sulfur dioxide, or hydrogen bromide. Alternatively, they can be obtained by first preparing a metal base-promoter intermediate and then, either treating a mixture of the intermediate with the nitrated hydrocarbon with an acidic gas, or treating the metal base-promoter intermediate with an acidic gas and then homogenizing it with the nitrated hydrocarbon. These and other modes of mixing the reactants are contemplated as alternative procedures of preparing the basic metal compositions of this invention.

The relative proportions of the reactants in the process of preparing the basic metal compositions are such that for each equivalent of the nitrated hydrocarbon, there is at least about 0.1 equivalent of the promoter and at least about one equivalent of the metal base. In most instances, no more than 20 equivalents of the promoter per equivalent of the nitrated hydrocarbon will be necessary although an excess of the promoter may be used. The preferred amounts of the reactants are such that for each equivalent of the nitrated hydrocarbon, there is from about 0.1 to 10 equivalents of the promoter and from about 2 to 50 equivalents of the metal base.

The equivalent weight of a nitrated hydrocarbon or a promoter depends on the number of the particular functional groups present within its molecular substance. The equivalent weight of a nitrated hydrocarbon is based on the number of nitrated groups in the molecule and is readily determined from the nitrogen content of the nitrated hydrocarbon. On the other hand, the equivalent weight of a phenol or alcohol is based on the number of hydroxy groups in the molecule and the equivalent of an aci-nitro alkane is based on the number of aci-nitro groups in a molecule. To illustrate, a nitrated hydrocarbon having one nitrated group per molecule has one equivalent per mole and a nitrated hydrocarbon having two nitrated groups per molecule has two equivalents per mole. Heptylphenol has one equivalent per mole and a bisphenol has two equivalents per mole. Glycerol has three equivalents per mole and nitro-propane has one equivalent per mole.

The equivalent weight of an alkali metal hydroxide, bicarbonate, or alcoholate is its molecular weight whereas the equivalent weight of an alkaline earth metal oxide, hydroxide, bicarbonate, or alcoholate is one-half its molecular weight. The equivalent weight of an alkali metal oxide or carbonate is one-half its molecular weight.

The amount of the acidic gas to be used in the reaction to prepare the basic metal compositions of this invention depends primarily upon the amount of the metal base.

Ordinarily it should be such that substantially all of the metal base in excess of what is stoichiometrically equivalent to the nitrated hydrocarbon is neutralized by the acidic gas, although in some instances only about 75% of the stoichiometric excess of the metal base need be neutralized in order to produce the desired product.

The process by which the basic metal compositions are prepared may be carried out in the presence of a diluent or solvent especially where one of the reactants is a viscous liquid or a solid. The solvent or diluent useful in the process is illustrated by benzene, toluene, naphtha, xylene, chlorobenzene, or mineral oil. The amount of the solvent should be sufficiently large so as to render the reaction mass fluid and susceptible to mixing. The process likewise may be carried out in the presence of some water, usually from about 1% to about 100% by weight of the metal base, which facilitates the reaction of the process.

The temperature at which the process is carried out may range from about 75° C. to about 250° C. or higher provided that it does not exceed the decomposition point of the reaction mixture. It usually is within the range of from about 100° C. to 200° C.

The treatment of the reaction mixture with an acidic gas has two principal beneficial effects. It clarifies and homogenizes the reaction mixture and it allows the incorporation of a relatively large amount of metal into the product. The promoter useful in the process likewise has these beneficial effects. The mechanism by which the homogeneous, metal-containing product is formed is not fully understood. It is believed, however, that the acidic gas converts the metal base to a salt as carbonate or chloride which forms a homogeneous complex with the other reactants. It is not necessary that all of the metal base be so converted to a salt. In many instances, a homogeneous product is obtained when as little as 75% of the stoichiometric excess of the metal salt is so converted and for the purpose of the specification and the claims in this invention, it is to be understood that the treatment of the reaction mixture with an acidic gas is effected so long as a homogeneous metal composition is obtained.

As indicated previously, the process by which basic metal compositions are obtained may be carried out by preparing a metal base-promoter intermediate, mixing the intermediate with the nitrated hydrocarbon and then treating the mixture with an acidic gas or it may be carried out by treating the metal base-promoter intermediate with an acidic gas so that the desired amount of the metal base is neutralized and then with the neutralized mixture the nitrated hydrocarbon. The latter alternative procedure is especially useful where the promoter is an alcohol and the acidic gas is carbon dioxide. The basic metal compositions prepared according to U.S. 2,959,551 are contemplated for use in the hydrocarbon fuels of this invention.

The following examples illustrate the preparation of the basic metal compositions useful in the hydrocarbon fuels of this invention:

EXAMPLE 1

A polyisobutylene having a molecular weight of 700–800 and prepared by the aluminum chloride-catalyzed polymerization of isobutylene at 0–30° C. is nitrated with a 10% excess (1.1 moles) of 70% aqueous nitric acid at 70–75° C. for 4 hours. The volatile components of the product mixture are removed by heating to 75° C./75 mm. To a mixture of 151 grams (0.19 equivalent) of this nitrated polyisobutylene, 113 grams (0.6 equivalent) of heptylphenol, 155 grams of water and 2,057 grams of mineral oil there is added at 70° C. 612 grams (8 equivalents) of barium oxide. This mixture is heated at 150° C. for an hour, then treated with carbon dioxide at this same temperature until the mixture is neutral (phenolphthalein indicator; ASTM D–974–53T procedure at 25° C.; a measurement of the degree of conversion of the metal reactant, i.e., barium oxide, by carbonation). The product mixture is filtered and the filtrate found to have the following analyses: percent barium sulfate ash, 27.6; percent N, 0.06; and metal ratio, 37.4.

EXAMPLE 2

A mixture of 584 grams (0.5 mole equivalent) of a nitrated polyisobutylene (prepared as indicated in Example 1), 64 grams (0.3 equivalent) of heptylphenol, 17 grams of water, 564 grams of mineral oil and 189 grams (2.4 equivalents) of barium oxide is heated at 120–130° C. for one hour. Carbon dioxide is bubbled into the mixture at 150° C. The mixture is then filtered and the filtrate shown to have the following analyses: percent barium sulfate ash, 18.1; percent N, 0.3; and metal ratio, 4.5.

EXAMPLE 3

A solvent-refined Mid-Continent petroleum fraction having a viscosity of 46 SUS (210° F.) is nitrated by treatment with 1.3 mole of 70% aqueous nitric acid at 30–88° C. for 8 hours and then at 100° C./12 mm. for one hour. This crude product is washed with dilute aqueous sodium bicarbonate solution, then with water, and then is dried at 100° C./12 mm. for an hour. A mixture of 955 grams (1.0 equivalent) of this nitrated petroleum fraction, 62 grams (0.3 equivalent) of heptylphenol, 750 grams of mineral oil, 120 grams of water and 498 grams (6.5 equivalents) of barium oxide is heated at reflux temperature for one hour. Water is removed by distillation and the temperature raised to 150° C. whereupon carbon dioxide is bubbled through the mixture at this same temperature until the mixture is neutral. Filtration yields a clear filtrate having the following analyses: percent barium sulfate ash, 27.6; percent N, 0.4; and metal ratio, 5.3.

EXAMPLE 4

The polyisobutylene of Example 1 is nitrated by treatment with 3.0 moles of 70% aqueous nitric acid at 95° C. for 14 hours. This crude product is diluted with an equal volume of petroleum ether, washed with aqueous sodium bicarbonate, then water, and then dried by heating at 105° C./30 mm. for one hour. To a mixture of 5,400 grams (7.5 equivalents) of this nitrated polyisobutylene, 1,500 ml. of methanol and 300 ml. of benzene there is added 628 grams (8.2 equivalents) of barium oxide. This mixture is heated at reflux temperature for 3 hours, then filtered and the filtrate freed of its volatile components by heating to 122° C./10 mm. The residue is a barium salt of the nitrated polyisobutylene. A mixture of 1,461 grams (1.85 equivalents) of this barium salt, 711 grams (1.75 equivalents) of a 50% mineral oil solution of an octyl phenol-formaldehyde condensation product (prepared by heating a 1:0.38 molar mixture of these reactants at 90–95° C. for 4 hours in the presence of aqueous ammonium hydroxide as a catalyst, and then removing the aqueous layer), 285 grams of water and 567 grams (7.4 equivalents) of barium oxide are heated at 100° C. for one hour. Volatile components of the mixture then are removed by distillation and the temperature raised to 150° C. whereupon carbon dioxide is bubbled into the mixture until the mixture is neutral. The product is diluted with 1,000 grams of mineral oil and filtered to yield a filtrate with the following analyses: percent barium sulfate ash, 25.0 and percent N, 0.5.

EXAMPLE 5

A solvent-refined, acid-treated Pennsylvania petroleum lubricating oil is nitrated by treatment with 1.5 moles of 70% aqueous nitric acid at 54–78° C. for 8 hours. After removal of volatile components of the product mixture by heating at 103° C./15 mm. for 2 hours a 787-gram portion (1.0 equivalent) of the nitrated product is treated with 62 grams (0.3 equivalent) of heptylphenol, 495 grams of mineral oil, 90 grams of water and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analyses: percent barium sulfate ash, 27.6; percent N, 0.5; and metal ratio, 4.1.

EXAMPLE 6

A mixture of 611 grams (0.75 equivalent) of the nitrated polyisobutylene of Example 1, 96 grams (0.45 equivalent) of heptylphenol, 2,104 grams of mineral oil, 188 grams of water and 736 grams (9.6 equivalents) of barium oxide is heated at reflux temperature for one hour. The water is distilled away and carbon dioxide passed into the mixture at 150° C. This carbonated mixture is filtered and the clear fluid filtrate shows the following analyses: percent barium sulfate ash, 26.3; percent N, 0.15; and metal ratio, 10.7.

EXAMPLE 7

A solvent-extracted, Mid-Continent petroluem fraction having a viscosity of 54 SUS (210° F.) is nitrated as in Example 5. To a mixture of 784 grams (1.0 equivalent) of this nitrated petroleum oil there is added 62 grams (0.3 equivalent) of heptylphenol, 498 grams of mineral oil, 90 grams of water and 376 grams (5 equivalents) of barium oxide. This mixture is heated at reflux temperature and then, after removal of water by distillation, at 150° C. at which temperature carbon dioxide is bubbled into the mixture until it is neutral. Filtration yields a filtrate having the following analyses: percent barium sulfate ash, 27.0; percent N, 0.5; and metal ratio, 3.9.

EXAMPLE 8

To a mixture of 408 grams (0.5 equivalent) of a nitrated polyisobutylene prepared as in Example 1, 62 grams (0.3 equivalent) of heptylphenol, 712 grams of toluene and 28 grams of water there is added at 70–86° C. 188 grams (2.4 equivalents) of barium oxide. This mixture is heated at 86° C. while carbon dioxide is passed through it. Water and toluene are removed by distillation and the residue is filtered to yield a filtrate having the following analyses: percent barium sulfate ash, 22.1; percent N, 0.5; and metal ratio, 4.9.

EXAMPLE 9

A mixture of 1 equivalent of a nitrated polypropylene having a molecular weight of 3,000, 2 equivalents of cetylphenol, mineral oil, and 3 equivalents of barium hydroxide is heated at reflux temperature for one hour. The temperature is raised to 150° C. and carbon dioxide is bubbled through the mixture at this temperature. The mixture is filtered and the filtrate is an oil solution of the product.

EXAMPLE 10

A solvent-extracted, Mid-Continent petroleum oil having a viscosity of 91 SUS (210° F.) is nitrated by treatment with 1.5 moles of 70% aqueous nitric acid at 70–90° C. for 4 hours and subsequent purification as in the above examples. A mixture of 1320 grams (2.0 equivalents) of this nitrated petroluem fraction, 123 grams (0.6 equivalent) of heptylphenol, 1484 grams of mineral oil, 192 grams of water and 756 grams (9.8 equivalents) of barium oxide is heated at reflux temperature for one hour. Water is removed by distillation and the temperature is increased to 150° C. whereupon carbon dioxide is passed into the mixture at this temperature. Filtration yields a filtrate with the following analyses: percent barium sulfate ash, 26.5; percent N, 0.5; and metal ratio, 4.2.

EXAMPLE 11

A Pennsylvania bright stock having a viscosity of 150 SUS (210° F.) is nitrated as in the above examples by treatment with 1.3 moles of 70% aqueous nitric acid. A mixture of 589 grams (1.0 equivalent) of this nitrated bright stock, 124 grams (0.6 equivalent) of heptylphenol, 720 grams of mineral oil, 90 grams of water and 378 grams (9.8 equivalents) of barium oxide is heated at 116° C. for an hour. Water is removed by distillation and the temperature raised to 150° C. Carbon dioxide is bubbled into the mixture at this temperature until the mixture is neutral. Filtration yields a filtrate having the following analyses: percent barium sulfate ash, 27.1; percent N, 0.5; and metal ratio, 4.3.

EXAMPLE 12

A mixture of 504 grams (0.4 equivalent) of a nitrated polyisobutylene prepared as in Example 1, 62 grams (0.3 equivalent) of heptylphenol and 646 grams of mineral oil is heated at 70° C. and then treated with 189 grams (5 equivalents) of barium oxide. The resulting mixture is heated to 100° C. and carbon dioxide is bubbled into the mixture at this temperature at a rate of 3 cubic feet per hour for 3 hours. At this point the mixture is slightly basic. This mixture is filtered to yield a clear, dark red filtrate having the following analyses: percent barium sulfate ash, 16.5; percent N, 0.3; and metal ratio, 4.9.

EXAMPLE 13

A polyisobutene having a molecular weight of 1000 (500 parts by weight) and 67% aqueous nitric acid (62.5 parts) are mixed at 65–70° C. for 11 hours. The product is a nitrated polyisobutene having a nitrogen content of 1.3%. To a mixture of 350 parts of the nitrated polyisobutene, 933 parts of mineral oil, and 130 parts of heptylphenol, there is added 622 parts of barium oxide at 60–100° C. in 2.5 hours. The mixture is agitated at 130° C. for 1.5 hours and blown with steam and carbon dioxide until it is substantially neutral to phenolphthalein indicator. The reaction mixture is then heated at 150° C. for 2.5 hours, blown with nitrogen for 10 hours at this temperature under reduced pressure. It is then filtered. The filtrate is diluted further with mineral oil to a 53% oil solution having a barium sulfate ash content of 38.3%, and a nitrogen content of 1.1%.

EXAMPLE 14

A mixture of 1000 parts of mineral oil, 2 equivalents of barium hydroxide, 1 equivalent of 1-nitro-3-octadecyl-cyclohexane and 1 equivalent (i.e., 0.5 mole) of 4,4'-methylene-bis(heptylphenol) is carbonated at 100–150° C. for 4 hours until the reaction mixture is substantially neutral to phenolphthalein indicator. It is filtered. The filtrate is the desired product.

EXAMPLE 15

A product is obtained by the procedure of Example 14 from calcium hydroxide (2 equivalents), nitro-triacontane (0.2 equivalent), and cresol (1 equivalent).

EXAMPLE 16

A product is obtained by the procedure of Example 14 except that the carbonation mixture consists of lithium hydroxide (3 equivalents), the nitrated polyisobutene of Example 13 (1 equivalent) and butylphenol (1 equivalent).

EXAMPLE 17

A product is obtained by carbonating a mixture of potassium hydroxide (3 equivalents), the nitrated polyisobutene of Example 13 (0.5 equivalent), butylphenol (1 equivalent) and xylene (sufficient to fluidize the reaction mixture).

EXAMPLE 18

The procedure of Example 17 is repeated except that strontium oxide (5 equivalents) is used in place of potassium hydroxide.

EXAMPLE 19

A copolymer of isobutene and piperylene (weight ratio of 98:2) having a molecular weight of 2000, is nitrated by the procedure similar to that described in Example 13 for the nitration of polyisobutene. A product is then prepared from this nitrated reactant by mixing it (1 equivalent) with alphabutyl-beta-naphthyl (1 equivalent) and barium hydroxide (7 equivalents), diluting it with mineral oil to a 50% oil mixture, and then carbonating the mixture at 120–160° C. until it is substantially neutral to phenolphthalein indicator. The carbonated product is filtered and the filtrate is an oil solution of the desired metal product.

EXAMPLE 20

A copolymer of isobutene and styrene (weight ratio of 95:5) having a molecular weight of 1500 is nitrated according to the procedure described in Example 13 for the nitration of polyisobutene. A metal product is obtained by the procedure of Example 19 except that this nitrated reactant replaced the nitrated copolymer of isobutene and piperylene and didodecylphenol replaces the alpha-butyl-beta-naphthyl.

EXAMPLE 21

A 50% oil mixture of barium hydroxide (5 equivalents), dicyclohexylphenol (1 equivalent) and a nitrated polyisobutene having a molecular weight of 50,000 and a nitrogen content of 0.9 is carbonated at 150–220° C. for 10 hours until the reaction mixture is substantially neutral to phenolphthalein. The product is filtered and the filtrate is an oil solution of the desired metal product.

EXAMPLE 22

The procedure of Example 2 is repeated except that sulfur dioxide is used in place of carbon dioxide in the process.

EXAMPLE 23

The procedure of Example 2 is repeated except that hydrogen chloride is used in place of carbon dioxide in the process.

EXAMPLE 24

A mixture of 575 grams (0.5 equivalent) of a nitrated polyisobutene (prepared as indicated in Example 1) is added to a mixture of 100 grams of mineral oil and a metal base prepared by carbonating a mixture of 300 grams of methanol and 172 grams (2.25 equivalents) of barium oxide at 50–60° C. until the mixture is substantially neutral to phenolphthalein indicator. The reaction mixture is heated at reflux temperature for 1 hour, mixed with 200 grams of oil, and then heated to 165° C. It is filtered and the filtrate is found to have a nitrogen content of 0.5%, a barium sulfate ash content of 21.5%, and a metal ratio of 3.9.

EXAMPLE 25

A mixture of 575 grams (0.5 equivalent) of a nitrated polyisobutene (prepared as indicated in Example 1), 27 grams (0.3 equivalent) of nitropropane, 195 grams of mineral oil, and 75 grams of water is heated to 70° C. To this mixture there is added 189 grams (2.5 equivalents) of barium oxide at 70–105° C. The reaction mixture is heated at reflux temperature (110° C.) for 1 hour and then to 150° C. It is then carbonated at 150–160° C. until it is substantially neutral to phenolphthalein indicator. The carbonated mixture is dried at 160° C. and then filtered. The filtrate has a nitrogen content of 1.6%, a barium sulfate ash content of 26.6%, and a metal ratio of 4.7.

EXAMPLE 26

A mixture of 575 grams (0.5 equivalent) of a nitrated polyisobutene (prepared as indicated in Example 1), 195 grams of mineral oil, 58 grams (0.3 equivalent) of heptylphenol is heated to 70° C. To this mixture are added 100 grams of water and 198 grams of a 50% aqueous solution of sodium hydroxide and the resulting mixture is heated at 105° C. for 1 hour and then dried to 150° C. It is then carbonated until it is substantially neutral and filtered. The filtrate has a nitrogen content of 0.43%, a sodium sulfate ash content of 15%, and a metal ratio of 4.

EXAMPLE 27

A mixture of 300 grams (0.26 equivalent) of a nitrated polyisobutene (prepared as indicated in Example 1, 165 grams of mineral oil, and 55 grams of water is heated to 70° C., calcium hydroxide (49 grams, 1.33 equivalents) is added to the mixture of 100° C. throughout a period of 2 hours. To this mixture there is then added 246 grams (2.62 equivalents) of phenol. The reaction mixture is heated at 105–110° C. for 2 hours and then heated to 150° C. It is mixed with 200 grams of oil and then blown with carbon dioxide at 150° C. until it is substantially neutralized. The carbonated product is heated to 225° C./30 mm. in an inert atmosphere to distill off volatile components. The residue is dissolved in benzene and the benzene solution is filtered. The filtrate is heated to 150° C./30 mm. to distill off benzene. The residue has a nitrogen content of 0.2%, a calcium sulfate ash content of 8.4%, and a metal ratio of 6.7.

EXAMPLE 28

A metal base-promoter composition is prepared by adding in small increments 36 grams (3 equivalents) of magnesium to 700 cc. of methanol containing a trace amount of iodine at 40° C. and carbonating the mixture until the mixture is clear. The metal base-promoter composition is then added to a mixture of 840 grams (0.6 equivalent) of a nitrated polyisobutene (prepared as indicated in Example 1 but having an equivalent weight of 400) and 803 grams of mineral oil at 75–85° C. The resulting mass is blown with nitrogen at 150° C. and filtered. The filtrate is found to have a nitrogen content of 0.47%, a magnesium sulfate ash content of 5.62%, and a metal ratio of 2.75.

EXAMPLE 29

A mixture of 840 grams (0.6 equivalent) of the nitrated polyisobutene of Example 28, 337 grams of mineral oil and 64 grams of methanol is mixed successively with three portions of barium oxide (70 grams and 43 grams), each addition of barium oxide being followed by a reflux period and a carbonation step. The resulting product is substantially neutral to phenolphthalein indicator. It is dried at 150° C. and filtered. The filtrate has a nitrogen content of 0.59%, a barium sulfate ash content of 14.5%, and a metal ratio of 2.84.

The basic metal compositions prepared by the above process are useful as additives in fuels such as gasolines, burner fuel oils, or diesel fuels. They are effective in preventing the deposition of sludge- or varnish-like deposits in the equipment in which the fuel is used. They are also effective in rendering the fuel more readily combustible. Fuels in which the additive of this invention is used may also contain other commonly used additives. such additives include, for instance, pre-ignition additives, anti-icing agents, color stabilizers, anti-oxidants, rust-inhibitors, dispersants, etc. In many instances, fuels may contain from 0.001% to about 2% (by weight) of one or more of such auxiliary additives. Such additives may be illustrated by metal detergents such as barium didodecylbenzene sulfonate, calcium salt of the hydrolyzed acidic product of polyisobutene having a molecular weight of 1000 and phosphorus pentasulfide or magnesium mahogany sulfonate, lead tetraethyl, ethylene dibromide, tertiary-dodecyl amine, the imidazoline obtained by the reaction of oleic acid and diethylene triamine or triethylene tetramine or the like.

The basic metal compositions of this invention may be incorporated in fuels simply by blending the desired amount of the additive with the fuel. Alternatively, a concentrate may be obtained by dissolving the additive in a solvent such as xylene, toluene, or mineral oil and then mixing the concentrate with the diesel fuel. The concentrate may contain as little as 5% (by weight) or as much as 90% or more of the solvent. On the other hand, the final fuel may contain from about 0.01% to 5% of the additive and usually contains from 0.1% to 2% of the additive.

Specific examples of fuels containing the additive of this invention include leaded gasolines containing ethylene dibromide (as the scavenger) and 0.05% (by weight) of the product of Example 1 and a Number 2 petroleum furnace fuel oil containing 0.01% of tertiary-octadecyl amine and 0.1% of the product of Example 10.

The improved combustion characteristics of diesel fuels containing the additives are indicated by a significantly reduced tendency of the engine to form black exhaust smoke. The latter advantages of such fuels are demonstrated by the following engine test. The test involves operating a single cylinder, 4-cycle diesel engine having a compression ratio of 19:1 under the following conditions: engine speed, 1500±10 r.p.m.; fuel rate, 2.7±0.04 lbs. per hour; engine load, approximately 6 brake horsepower; air: fuel ratio, approximately 19:1; and sump oil temperature, 131±3° F. The engine is equipped with a "Smoke Tube" apparatus for measuring the black exhaust smoke by allowing the exhaust gas to pass through a glass tube (outside diameter of 0.7 inch) in which the smoke is collected on the inside wall of the tube. The effectiveness of the additive to prevent the formation of black smoke is rated by comparing the tube with a set of standard tubes having various amounts of deposits and rated on a numerical scale of 0 to 10, 0 being indicative of no deposit and 10 being indicative of heavy deposit. The engine is also equipped with another apparatus ("Smoke Spot" apparatus) for measuring the black exhaust smoke by allowing the exhaust gas to pass through a white filter paper. The amount of the black deposit on the filter paper is also an indication of the effectiveness of the additive. The deposit likewise is rated by comparing the filter paper with a set of standards, i.e., papers having various amounts of deposits and rated on a numerical scale of 0 to 10, 0 being indicative of no deposit and 10 being indicative of heavy deposit. The base fuel used is a No. 2 diesel fuel containing 1% by weight of sulfur. After a break-in operation to establish equilibrium conditions, the engine is operated on the base fuel until a Smoke Spot Rating is within the range of from 8.5 to 9.0 and the Smoke Tube Rating is within the range of from 6.0 to 6.5. The engine is then operated on the test fuel (which is prepared by incorporating the additive into the base fuel) until the equilibrium operation conditions are again established. The Smoke Tube Rating and the Smoke Spot Rating are recorded at the end of 15 seconds and 30 seconds after the equilibrium conditions are obtained. The results of the test are shown in Table I below.

Another unique characteristic of the basic metal composition of this invention is that it does not tend to emulsify water in diesel fuels. As indicated previously, diesel fuels often come into contact with water in storage and transportation. If the fuel readily emulsifies water; it will carry the emulsified water with it as it is used in engines. Water will cause corrosion of metal equipment coming into contact with the fuel. It also has a detrimental effect on the combustion characteristics of the fuel.

It is thus apparent that the emulsion resistance of the metal compositions of this invention is an important advantage. The emulsion resistance of the metal compositions of this invention is shown by the results shown in Table II, of an Emulsibility Test. The test consists of preparing a mixture of 100 cc. of a diesel fuel and 1 cc. of water, placing it in a 4-ounce, square glass bottle (width and depth dimension of 1¾ x 1¾ inches), homogenizing the mixture, and then allowing the mixture to stand at room temperature so as to allow a separation of the water layer and the fuel layer. At the end of periods of standing of 5 minutes, 3 hours, 6 hours, and 24 hours, the sample is inspected for turbidity by placing a newspaper print behind the bottle and viewing it through the fuel layer of the sample. The turbidity is then rated on a numerical scale from 0 to 3, 0 being indicative of a clear sample (i.e., complete separation of the water layer and the fuel layer) and 3 being indicative of cloudiness of the sample to the extent that the newspaper print is completely illegible. A lower rating indicates a higher emulsion resistance. The fuel used in the test is a No. 2 diesel fuel. For purposes of comparison, a commercial barium mahogany sulfonate detergent is also tested and its great tendency to promote emulsion of water and fuel is shown by the results in Table II.

TABLE II

| Additive | Percent by Wt. in Fuel | Test Results | | | |
|---|---|---|---|---|---|
| | | 5 mins. | 3 Hrs. | 6 Hrs. | 24 Hrs. |
| None | | 0-1 | 0 | 0 | 0 |
| Basic Ba Mahogany Sulfonate | 0.5 | 2-3 | 3 | 3 | 3 |
| Example 13 | 0.5 | 0-1 | 0 | 0 | 0 |

What is claimed is:

1. A liquid hydrocarbon fuel containing from about 0.01% to about 5% by weight of an oil-soluble, basic metal composition prepared by the process which comprises treating a mixture comprising a nitrated aliphatic hydrocarbon having a molecular weight of at least about 250, at least about 1 equivalent of a metal base wherein the metal is selected from the class consisting of alkali and alkaline earth metals, and at least about 0.1 equivalent of a promoter selected from the class consisting of phenols, alcohols, and aci-nitro alkanes having up to about 10 carbon atoms; with an acidic gas selected from the class consisting of carbon dioxide, hydrogen halides and sulfur oxides.

2. The fuel of claim 1 wherein the process for preparing the basic metal composition is carried out by preparing a mixture of the metal base and the promoter, treating the mixture with an acidic gas to form a substantially neutral mixture, and homogenizing the substantially neutral mixture with the nitrated aliphatic hydrocarbon.

3. The fuel of claim 1 wherein the process for preparing the basic metal composition is carried out by preparing a mixture of the metal base and the promoter and treating

TABLE I

| Additive | Percent by Wt. in Fuel | Smoke Spot Rating | | Smoke Tube Rating | |
|---|---|---|---|---|---|
| | | 15 Seconds | 30 Seconds | 10 Seconds | 15 Seconds |
| None | | 7.5-8 | 0.0, 9.5 | 4.5, 5.5 | 6.0, 6.5 |
| Ex. 13 | 0.65 | 6.5, 3.5 | 7.0, 4.0 | 2.5, 1.0 | 3.0, 1.0 |
| Ex. 13 | 0.325 | 5.5, 5.5 | 6.5, 6.5 | 2.5, 1.5 | 3.5, 2.0 |
| Ex. 24 | 1.16 | | 6.0 | | 2.5 |
| Ex. 25 | 0.94 | | 7.0 | | 2.5 |
| Ex. 29 | 1.68 | | 6.5 | | 2.0 | the mixture and the nitrated aliphatic hydrocarbon with the acidic gas.

4. The fuel of claim 1 wherein the nitrated hydrocarbon is a nitrated olefin polymer.

5. The fuel of claim 1 wherein the metal base is an alkaline earth metal hydroxide.

6. The fuel of claim 1 wherein the promoter is an alkylphenol.

7. The fuel of claim 1 wherein the acidic gas is carbon dioxide.

8. The fuel of claim 1 wherein the basic metal composition is prepared by the process which comprises (A) preparing a mixture comprising a nitrated olefin polymer having a molecular weight of from about 250 to 100,000, from about 1 to about 20 equivalents of an alkaline earth metal hydroxide, and from about 0.1 to 10 equivalents of an alkylphenol; and (B) treating the mixture of (A) with carbon dioxide.

9. A diesel fuel containing from about 0.01% to about 5% by weight of an oil-soluble, basic metal composition prepared by the process which comprises (A) preparing a mixture comprising a nitrated polyisobutene having a molecular weight of from about 250 to 10,000, from about 2 to 20 equivalents of barium hydroxide, from about 0.1 to 10 equivalents of an alkylphenol; and (B) treating the mixture of (A) with carbon dioxide.

10. A diesel fuel containing from about 0.01% to about 5% by weight of an oil-soluble, basic metal composition prepared by the process which comprises (A) preparing a mixture comprising a nitrated polyisobutene having a molecular weight of from about 250 to 10,000, from about 2 to 20 equivalents of barium hydroxide, from about 0.1 to 10 equivalents of an alcohol; and (B) treating the mixture of (A) with carbon dioxide.

11. A diesel fuel containing from about 0.01% to about 5% by weight of an oil-soluble, basic metal composition prepared by the process which comprises (A) preparing a mixture comprising a nitrated polyisobutene having a molecular weight of from about 250 to 10,000, from about 2 to 20 equivalents of barium hydroxide, from about 0.1 to 10 equivalents of an aci-nitro alkane having up to about 10 carbon atoms; and (B) treating the mixture of (A) with carbon dioxide.

12. A diesel fuel containing about 0.01% to 5% by weight of an oil-soluble basic metal composition prepared by the process which comprises (A) treating a mixture comprising a nitrated polyisobutene having a molecular weight of from about 700 to 10,000, from about 2 to 20 equivalents of barium hydroxide, and from about 0.1 to 10 equivalents of an alkylphenol having up to about 200 aliphatic carbon atoms; and (B) treating the mixture of (A) with carbon dioxide.

13. The fuel of claim 12 wherein the alkylphenol is heptylphenol.

14. The fuel of claim 12 wherein the nitrated polyisobutene has a molecular weight of about 1,000.

15. A diesel fuel containing from about 0.01% to about 5% by weight of an oil-soluble, basic metal composition prepared by the process which comprises (A) preparing a mixture of from about 1 to 20 equivalents of an alkaline earth metal oxide and from about 1 to 20 equivalents, per equivalent of the metal oxide, of an alcohol, carbonating the mixture until it is substantially neutral and homogenizing the carbonated mixture with a nitrated olefin polymer having a molecular weight of from about 700 to 10,000.

16. The fuel of claim 15 wherein the alcohol is methanol.

17. The fuel of claim 15 wherein the alcohol is methanol, the nitrated olefin polymer is a nitrated polyisobutene, and the alkaline earth metal oxide is barium oxide.

18. In the method of operating internal combustion engines on a liquid hydrocarbon fuel having the tendency of forming black exhaust smoke, the improvement which comprises burning the fuel having incorporated therein from about 0.01% to about 5% by weight of an oil-soluble, basic metal composition prepared by the process which comprises treating a mixture comprising a nitrated aliphatic hydrocarbon having a molecular weight of at least about 250, at least about 1 equivalent of a metal base wherein the metal is selected from the class consisting of alkali and alkaline earth metals, and at least about 0.1 equivalent of a promoter selected from the class consisting of phenols, alcohols, and aci-nitro alkane having up to about 10 carbon atoms; with anacidic gas selected from the class consisting of carbon dioxide, hydrogen halides and sulfur oxides.

19. In the method of operating internal combustion engines on a liquid hydrocarbon fuel having the tendency of forming black exhaust smoke, the improvement which comprises burning the fuel having incorporated therein from about 0.01% to about 5% by weight of an oil-soluble, basic metal composition prepared by the process which comprises (A) treating a mixture comprising a nitrated polyisobutene having a molecular weight of from about 700 to 10,000, from about 2 to 20 equivalents of barium hydroxide, and from about 0.1 to 10 equivalents of an alkylphenol having up to about 200 aliphatic carbon atoms; and (B) treating the mixture of (A) with carbon dioxide.

References Cited

UNITED STATES PATENTS 2,959,551 11/1960 Le Suer _____ 252—51.5 XR
3,085,866 4/1963 Gay et al. _____ 44—57

FOREIGN PATENTS 1,292,474 3/1962 France.

DANIEL E. WYMAN, Primary Examiner.

W. J. SHINE, Assistant Examiner.